(12) United States Patent
Takahashi et al.

(10) Patent No.: US 12,251,770 B2
(45) Date of Patent: Mar. 18, 2025

(54) CONTROL DEVICE, CONTROL SYSTEM, WELDING SYSTEM, CONTROL METHOD, METHOD FOR MANUFACTURING JOINED BODY, AND STORAGE MEDIUM

(71) Applicant: KABUSHIKI KAISHA TOSHIBA, Minato-ku (JP)

(72) Inventors: Hiromasa Takahashi, Minato (JP); Masahiro Saito, Yokohama (JP); Yasunori Chiba, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 677 days.

(21) Appl. No.: 16/915,304

(22) Filed: Jun. 29, 2020

(65) Prior Publication Data

US 2021/0379689 A1 Dec. 9, 2021

(30) Foreign Application Priority Data

Jun. 3, 2020 (JP) ................................ 2020-096812

(51) Int. Cl.
*B23K 11/25* (2006.01)
*B23K 11/11* (2006.01)
(Continued)

(52) U.S. Cl.
CPC .............. *B23K 11/25* (2013.01); *B23K 11/11* (2013.01); *G01N 29/07* (2013.01); *G01N 29/4427* (2013.01); *G01N 2291/2672* (2013.01)

(58) Field of Classification Search
CPC ....... B23K 11/25; B23K 11/11; B23K 11/252; B23K 11/315; B23K 11/115;
(Continued)

(56) References Cited

U.S. PATENT DOCUMENTS 3,678,736 A 7/1972 May
5,343,011 A * 8/1994 Fujii .................... B23K 11/258
219/109

(Continued)

FOREIGN PATENT DOCUMENTS

JP 3-233352 A 10/1991
JP 6-106362 A 4/1994
(Continued)

OTHER PUBLICATIONS

Ushijima et al., "Spot Welding Inspection Robot Achieving Labor Saving and Improvement of Reliability Using 3D Ultrasonic Inspection Equipment", Toshiba Review, vol. 74, No. 4, 2019, pp. 25-28 (with English Abstract).

(Continued)

*Primary Examiner* — Suman K Nath
(74) *Attorney, Agent, or Firm* — Oblon, McClelland, Maier & Neustadt, L.L.P.

(57) ABSTRACT

According to one embodiment, a control device controls a welding device performing resistance welding. When an inspection value satisfies a first condition, the control device modifies a setting value for the resistance welding and causes the welding device to perform the resistance welding. The inspection value is obtained by an inspection of a weld zone formed by the resistance welding. The control device does not cause the welding device to perform the resistance welding when the inspection value satisfies a second condition.

16 Claims, 11 Drawing Sheets

(51) Int. Cl.
  *G01N 29/07*   (2006.01)
  *G01N 29/44*   (2006.01)
(58) Field of Classification Search
  CPC .. B23K 31/125; G01N 29/07; G01N 29/4427; G01N 29/225; G01N 29/265; G01N 2291/2672; G01N 2291/045; G01N 2291/106
  See application file for complete search history.

(56) References Cited

U.S. PATENT DOCUMENTS

| | | |
|---|---|---|
| 2009/0178482 A1 | 7/2009 | Hough et al. |
| 2016/0074970 A1* | 3/2016 | Zhai .................. B23K 37/0417 73/620 |
| 2016/0231291 A1* | 8/2016 | Boulware ............. G01N 29/24 |
| 2016/0320344 A1 | 11/2016 | Spencer et al. |
| 2017/0021446 A1* | 1/2017 | Maev ..................... B23K 11/25 |
| 2017/0046977 A1* | 2/2017 | Becker ................. G09B 19/003 |
| 2017/0356071 A1* | 12/2017 | Toyoda ................... B21C 51/00 |
| 2020/0003735 A1* | 1/2020 | Ushijima ............. G01N 29/225 |
| 2020/0018727 A1 | 1/2020 | Ono et al. |
| 2021/0312604 A1* | 10/2021 | Bron ...................... G01N 29/12 |

FOREIGN PATENT DOCUMENTS

| | | |
|---|---|---|
| JP | 2008-51645 A | 3/2008 |
| JP | 3189500 U | 3/2014 |
| JP | 2018-70138 A | 5/2018 |
| JP | 2018-136791 A | 8/2018 |
| JP | 2019-090727 A | 6/2019 |
| JP | 2020-8452 A | 1/2020 |
| WO | WO 2016/164457 A1 | 10/2016 |

OTHER PUBLICATIONS

Abe et al., "Matrixeye™Portable 3D Ultrasonic Inspection System", Toshiba Review, vol. 60, No. 4, 2005, pp. 48-51 (with English Abstract).

Karasawa et al., "Self-Propelled Ultrasonic Testing System for Steel Plate Deck Bridges Applying Matrixeye™ 3D-SAFT Array Inspection Equipment", Toshiba Review, vol. 70, No. 9, 2015, pp. 24-28 (with English Abstract).

* cited by examiner

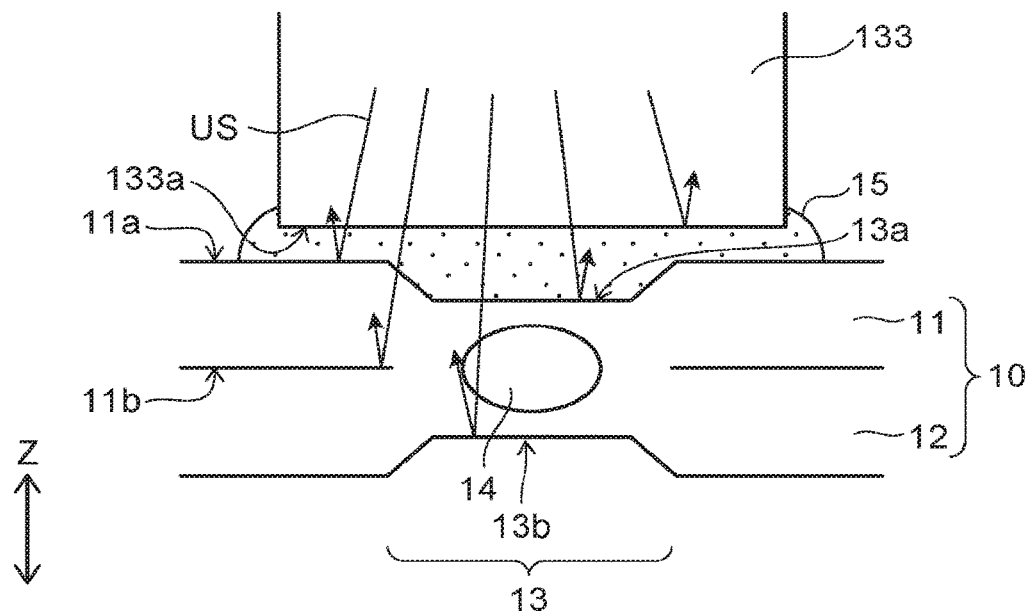
FIG. 7A
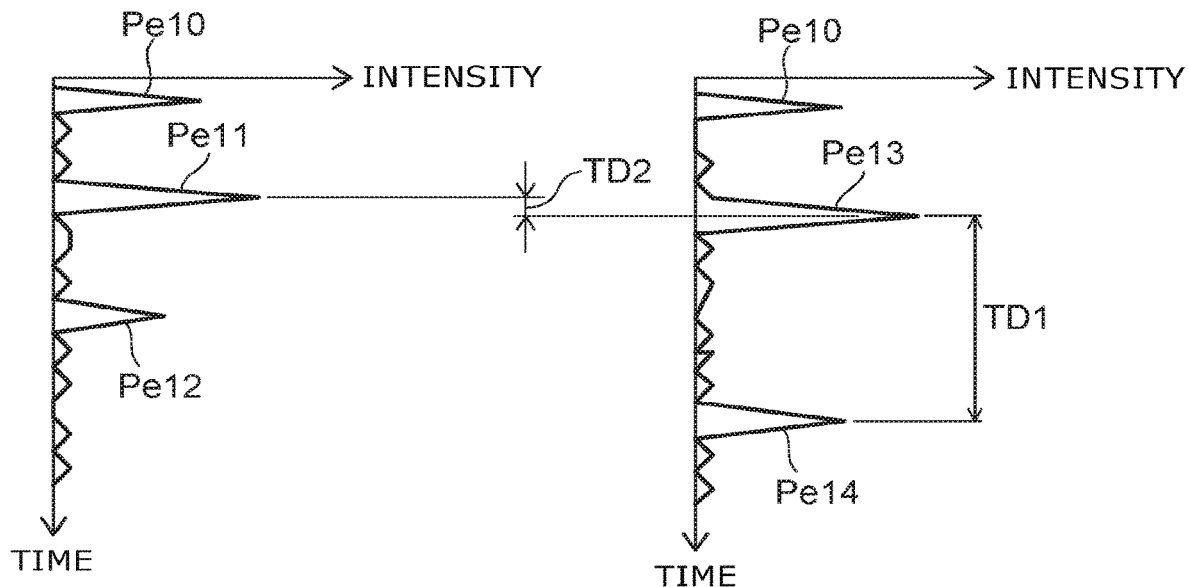
FIG. 7B
FIG. 7C

CONTROL DEVICE, CONTROL SYSTEM, WELDING SYSTEM, CONTROL METHOD, METHOD FOR MANUFACTURING JOINED BODY, AND STORAGE MEDIUM

CROSS-REFERENCE TO RELATED APPLICATIONS

This application is based upon and claims the benefit of priority from Japanese Patent Application No. 2020-96812, filed on Jun. 3, 2020; the entire contents of which are incorporated herein by reference.

STATEMENT DESIGNATING A GRACE PERIOD DISCLOSURE

The disclosure "SPOT WELDING INSPECTION ROBOT ACHIEVING LABOR SAVING AND APPROVEMENT OF RELIABILITY USING 3D ULTRASONIC INSPECTION EQUIPMENT" from the Toshiba Review, 2019, vol. 74, No. 4, p 25-28 is an invention disclosure which does not qualify as prior art under 35 U.S.C. § 102(a)(1). That publication names three inventors Akira USHIJIMA, Masahiro SAITO, and Shin MATSUMOTO. The overlapping disclosures from that Toshiba Review, 2019, vol. 74, No. 4, P25-28 publication overlapping with the disclosure in the present application was made by the named inventor Masahiro SAITO of the present application. Thereby that publication is a grace period publication by the present inventors.

FIELD

Embodiments described herein relate generally to a control device, a control system, a welding system, a control method, a method for manufacturing a joined body, and a storage medium.

BACKGROUND

Resistance welding is one method for joining multiple members. In resistance welding, multiple overlaid members are melted by heat by causing a current to flow in the members. High productivity is desirable for a welding device performing the resistance welding.

BRIEF DESCRIPTION OF THE DRAWINGS

FIGS. 7A to 7C are schematic views illustrating an operation of the detector;

DETAILED DESCRIPTION

Figure 1:
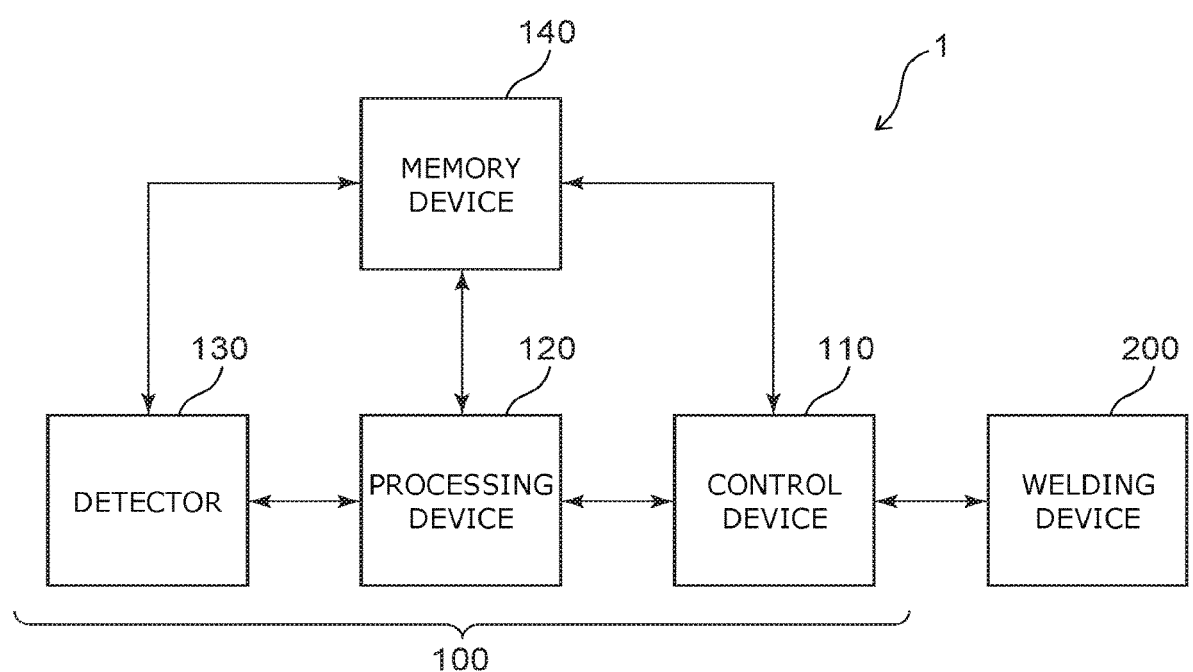
FIG. 1 is a block diagram illustrating a configuration of a control system according to an embodiment.

According to one embodiment, a control device controls a welding device performing resistance welding. When an inspection value satisfies a first condition, the control device modifies a setting value for the resistance welding and causes the welding device to perform the resistance welding. The inspection value is obtained by an inspection of a weld zone formed by the resistance welding. The control device does not cause the welding device to perform the resistance welding when the inspection value satisfies a second condition.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

FIG. 1 is a block diagram illustrating a configuration of a control system according to an embodiment.

As illustrated in FIG. 1, the control system 100 according to the embodiment includes a control device 110, a processing device 120, a detector 130, and a memory device 140. A welding system 1 according to the embodiment includes the control system 100 and a welding device 200.

The control device 110 controls the welding device 200. The welding device 200 performs resistance welding. The detector 130 probes a weld zone formed by the resistance welding. In the probe, the detector 130 transmits an ultrasonic wave toward the weld zone and detects reflected waves from the weld zone. The processing device 120 inspects the weld zone by using the detection result of the reflected waves of the detector 130. The memory device 140 stores data relating to the resistance welding and the inspection of the weld zone.

The control device 110, the processing device 120, the detector 130, the memory device 140, and the welding device 200 are connected to each other via wired communication, wireless communication, or a network (a local area network or the Internet).

An example will now be described in which the welding device 200 performs resistance spot welding, which is one type of resistance welding. In resistance spot welding, multiple members are joined by a dot-shaped weld zone.

Figure 2:
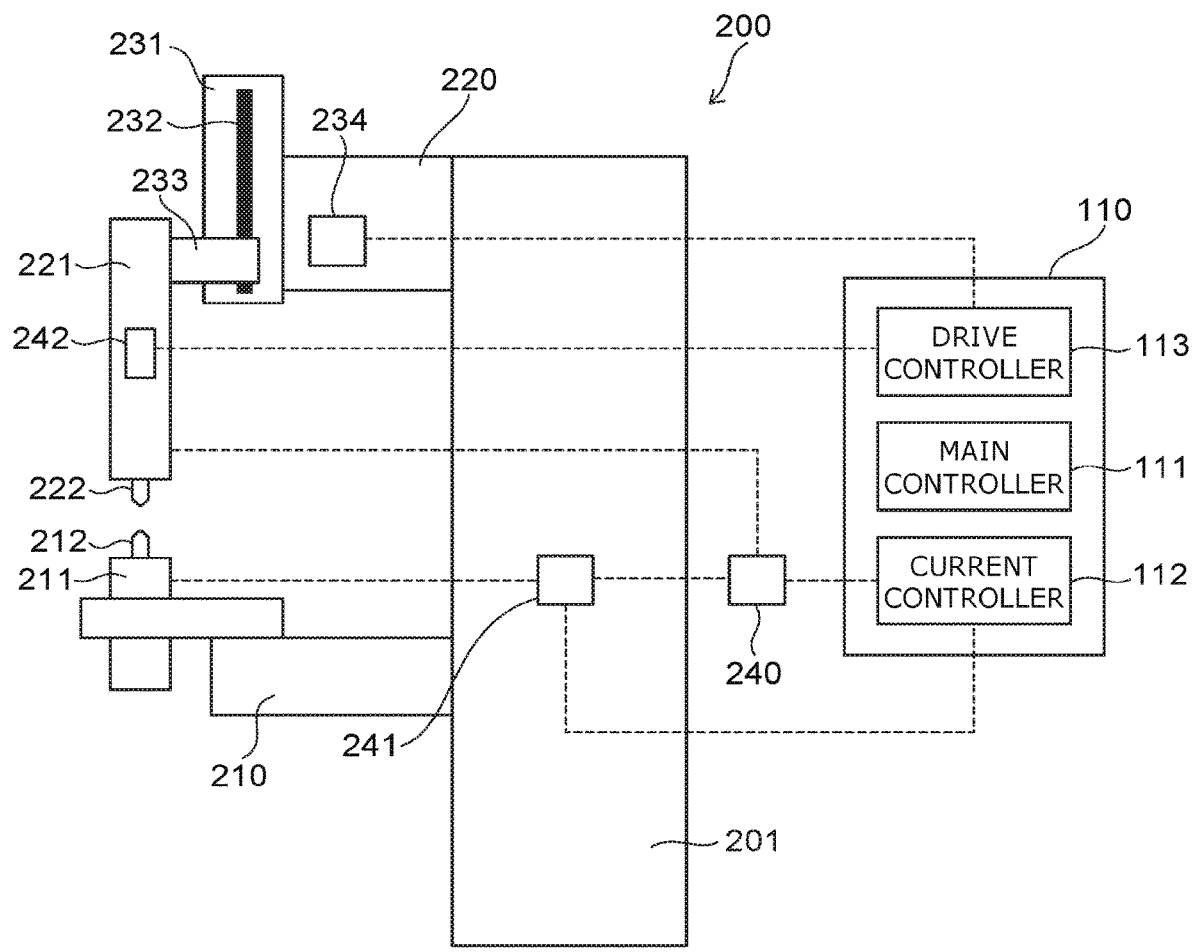
FIG. 2 is a schematic view illustrating a welding device.

FIG. 2 is a schematic view illustrating the welding device.

An example of the welding device 200 will be described. As illustrated in FIG. 2, the welding device 200 includes a base 201, a lower arm 210, a lower holder 211, a lower electrode 212, an upper arm 220, an upper holder 221, an upper electrode 222, a guide 231, a movable member 233, a driver 234, a power supply 240, a current detector 241, and a pressure detector 242.

The base 201 is fixed at a prescribed location in a manufacturing site. The lower arm 210 and the upper arm 220 are fixed to the base 201. The lower arm 210 and the upper arm 220 face each other and are separated from each other in the vertical direction. For the description herein, the direction from the lower arm 210 toward the upper arm 220 is taken as "up", and the reverse direction is taken as "down". These directions are based on the positional relationship between the lower arm 210 and the upper arm 220 and do not suggest the direction of gravity. The direction from the lower arm 210 toward the upper arm 220 may be tilted from the vertical direction.

The lower holder 211 is mounted to the lower arm 210. The lower holder 211 may be movable with respect to the lower arm 210. The lower electrode 212 is fixed to the lower holder 211 and protrudes upward.

The guide 231 is fixed to the upper arm 220. The guide 231 includes a pole 232 extending along the vertical direction. The movable member 233 is mounted to the pole 232. The upper holder 221 is fixed to the movable member 233. The upper electrode 222 is fixed to the upper holder 221 and protrudes downward. The lower electrode 212 and the upper electrode 222 face each other in the vertical direction.

The driver 234 causes the movable member 233 to move. The movable member 233 moves along the pole 232. When the movable member 233 moves, the position in the vertical direction of the upper electrode 222 changes with respect to the lower electrode 212. In other words, the distance in the vertical direction between the lower electrode 212 and the upper electrode 222 changes.

The power supply 240 is electrically connected to the lower and upper electrodes 212 and 222. When welding, the power supply 240 applies a voltage between the lower electrode 212 and the upper electrode 222. For example, the power supply 240 connects the lower electrode 212 to a ground potential and applies a voltage to the upper electrode 222. Thereby, a current flows between the lower electrode 212 and the upper electrode 222.

When welding, the current detector 241 detects the current flowing through the lower and upper electrodes 212 and 222. In the illustrated example, the current detector 241 is electrically connected between the power supply 240 and the lower electrode 212. The current detector 241 includes, for example, an ammeter.

When welding, the pressure detector 242 detects the pressure applied to the welded member. In the illustrated example, the pressure detector 242 is provided in the upper holder 221 and detects the pressure applied to the upper electrode 222. The pressure that is applied to the upper electrode 222 has a relationship with the pressure applied to the members. In other words, the pressure detector 242 indirectly detects the pressure applied to the welded member based on the pressure applied to the upper electrode 222. The pressure detector 242 includes, for example, a strain gauge.

The control device 110 includes a main controller 111, a current controller 112, and a drive controller 113. The main controller 111 transmits commands to the current controller 112 and the drive controller 113. For example, the main controller 111 transmits various setting values for welding to the current controller 112 and the drive controller 113.

The current controller 112 is electrically connected to the power supply 240 and the current detector 241. The current controller 112 controls the power supply 240 based on the detection result of the current detector 241. For example, the current controller 112 controls the power supply 240 so that the current flowing through the lower and upper electrodes 212 and 222 becomes the setting value transmitted from the main controller 111. Also, the current controller 112 supplies the current between the lower electrode 212 and the upper electrode 222 for the time specified by the setting value transmitted from the main controller 111.

The drive controller 113 is electrically connected to the driver 234 and the pressure detector 242. The drive controller 113 controls the driver 234. For example, the drive controller 113 controls the driver 234 so that the pressure applied to the welded member becomes the setting value transmitted from the main controller 111.

The welding device 200 that is controlled by the control device 110 is not limited to the example illustrated in FIG. 2; another known structure is applicable. For example, the welding device may include a manipulator. The lower arm 210, the lower holder 211, the lower electrode 212, the upper arm 220, the upper holder 221, the upper electrode 222, etc., may be provided as an end effector at the tip of the manipulator.

Figure 3:
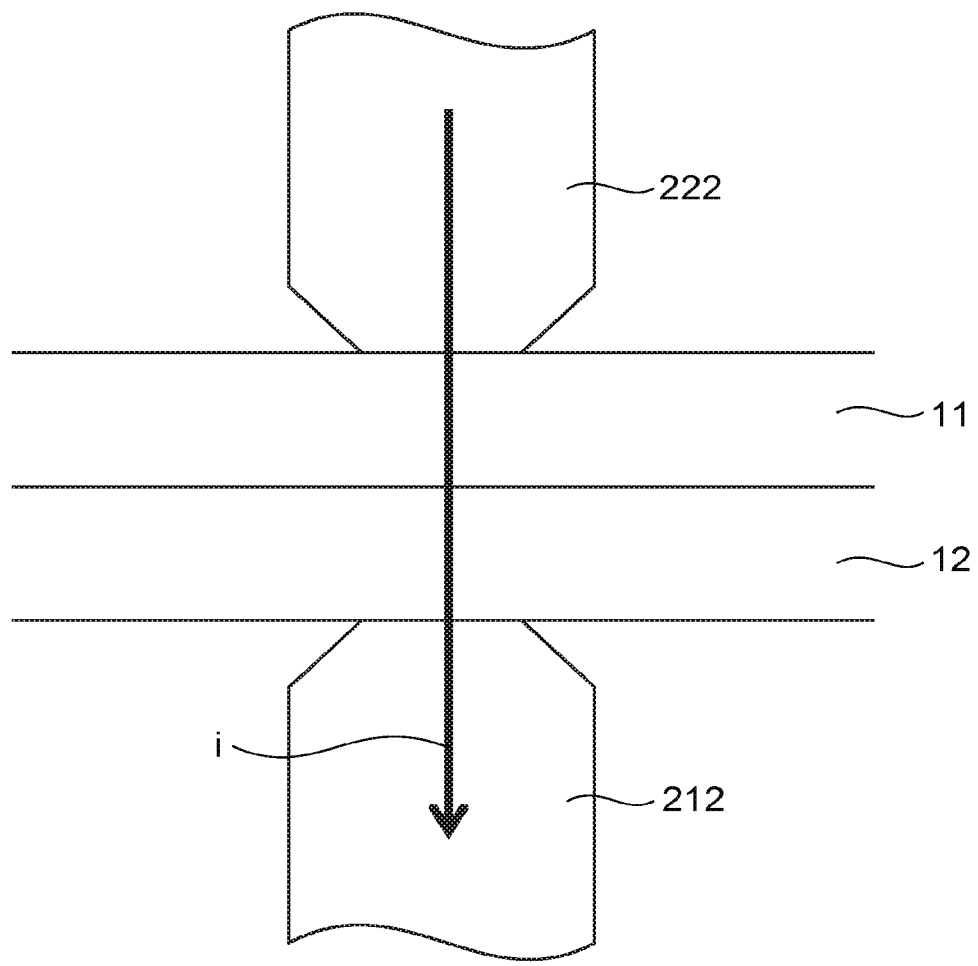
FIG. 3 is a schematic view illustrating a state of resistance spot welding.

FIG. 3 is a schematic view illustrating a state of resistance spot welding.

FIG. 3 illustrates a state when a first member 11 and a second member 12 are welded by resistance spot welding. First, the first member 11 and the second member 12 are placed on the lower electrode 212. The driver 234 moves the upper electrode 222 toward the lower electrode 212. The first member 11 and the second member 12 are sandwiched and pressed by the lower electrode 212 and the upper electrode 222. In this state, a current i is supplied to the lower electrode 212, the first member 11, the second member 12, and the upper electrode 222. When the current i flows, heat is generated by the resistance of the first and second members 11 and 12. Portions of the first and second members 11 and 12 are melted and mix with each other. The first member 11 and the second member 12 are joined by the melted portions cooling and solidifying.

Figure 4:
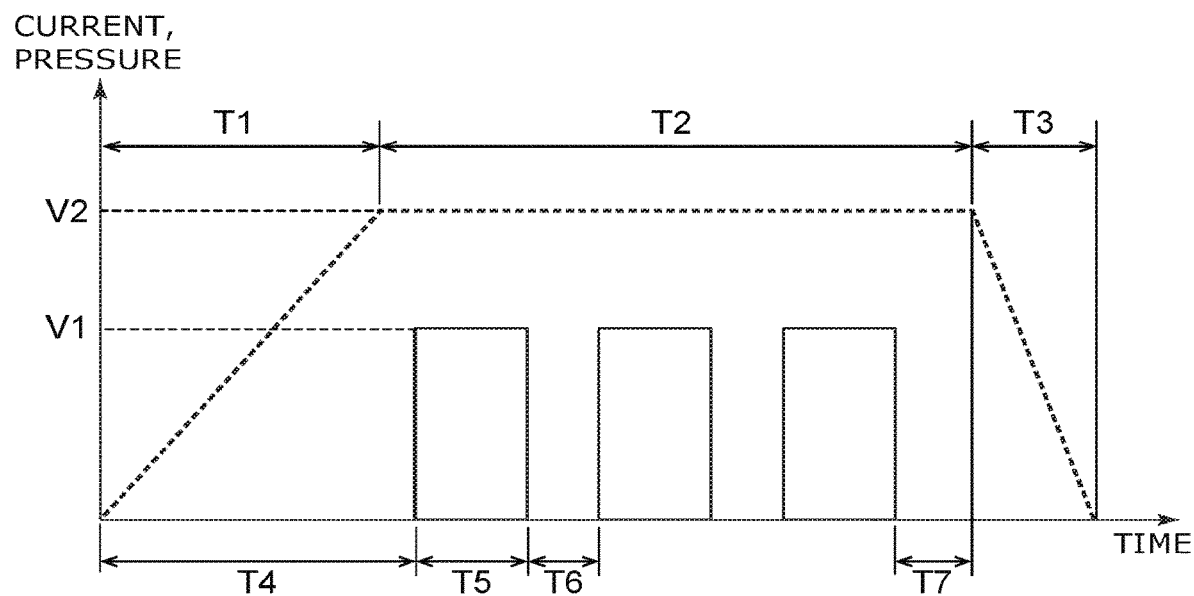
FIG. 4 is a schematic view illustrating a current and a pressure when performing the resistance spot welding.

FIG. 4 is a schematic view illustrating the current and the pressure when performing the resistance spot welding.

In FIG. 4, the horizontal axis is time. The vertical axis is the magnitudes of the current and the pressure. The solid line illustrates the change of the current flowing through the lower and upper electrodes 212 and 222. The broken line illustrates the change of the pressure applied to the object of the resistance spot welding.

For example, as illustrated in FIG. 4, the pressure that is applied from the upper electrode 222 to the first member 11 increases when the upper electrode 222 moves toward the lower electrode 212 and contacts the first member 11. The pressure is maintained at a constant after being increased to a prescribed value. A current is supplied in pulses to the first and second members 11 and 12 in the state in which the pressure is maintained at the prescribed value. After supplying the current, the state in which the first member 11 is pressed is maintained. Subsequently, the pressure that is applied from the upper electrode 222 to the first member 11 is reduced.

The standard values illustrated in FIG. 4 are predetermined for a pressure increase time T1, a pressing time T2, a pressure decrease time T3, a squeeze time T4, a current-on time T5, a current-off time T6, a hold time T7, a current value V1, and a pressure value V2. The squeeze time T4 is the time from the start of pressing the first member 11 to the start of the supply of the current. The hold time T7 is the time from the end of the supply of the current to the end of pressing the first member 11. The current value V1 is the maximum value of the current flowing through the lower and upper electrodes 212 and 222. The pressure value V2 is the maximum value of the pressure applied to the first member 11. When an inspection value, which is described below, does not satisfy a designated condition, the control device 110 sets these values to the predetermined standard values and causes the welding device 200 to perform resistance spot welding.

Figure 5:
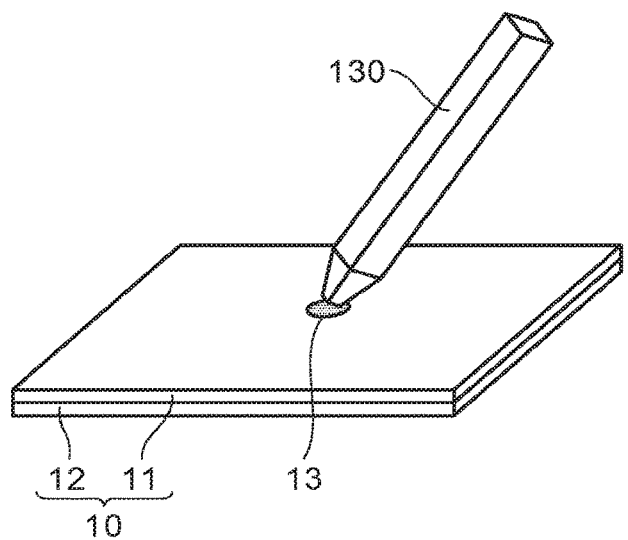
FIG. 5 is a schematic view illustrating a state of a probe by a detector.
Figure 6:
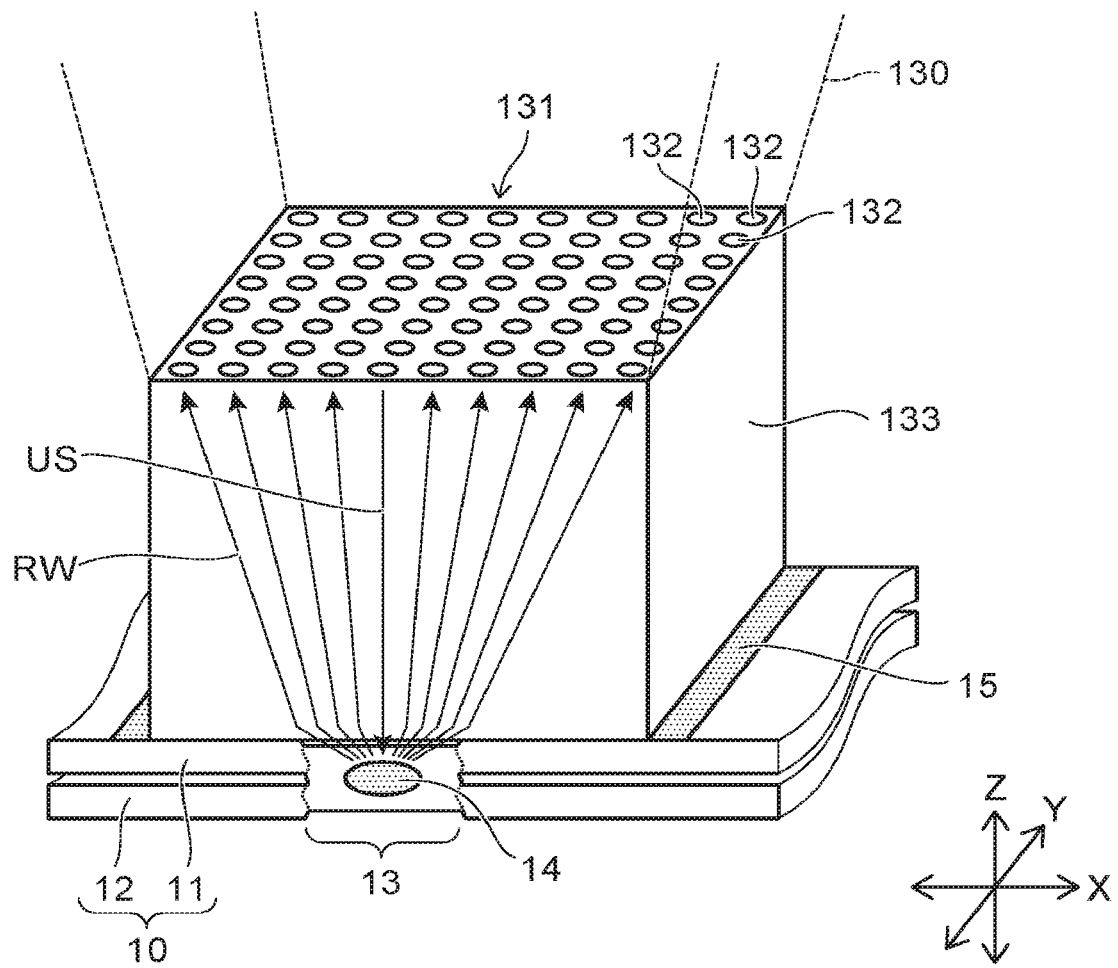
FIG. 6 is a schematic view illustrating an internal structure of the detector

FIG. 5 is a schematic view illustrating a state of the probe by the detector. FIG. 6 is a schematic view illustrating the internal structure of the detector.

For example, the detector 130 has a configuration that can be gripped by the hand of a human as illustrated in FIG. 5. In the example illustrated in FIG. 5, a joined body 10 that is manufactured by welding the first member 11 and the second member 12 is inspected. The human that grips the detector 130 probes and inspects a weld zone 13 of the joined body 10 by causing the tip of the detector 130 to contact the weld zone 13. The weld zone 13 is formed by resistance spot welding and is a portion where the first member 11 and the second member 12 are joined. In the weld zone 13 as illustrated in FIG. 6, a solidified portion 14 is formed by a portion of the first member 11 and a portion of the second member 12 melting, mixing, and solidifying.

As illustrated in FIG. 6, a detector 131 and a propagating part 133 are provided in the detector 130. The detector 131 includes multiple detection elements 132. The detection elements 132 are, for example, transducers that emit an ultrasonic wave having a frequency not less than 1 MHz and not more than 100 MHz. The multiple detection elements 132 are arranged in a first direction and a second direction that cross each other. In the example illustrated in FIG. 6, the multiple detection elements 132 are arranged in an X-direction and a Y-direction that are orthogonal to each other.

The propagating part 133 is provided at the tip of the detector 130. The detector 131 is covered with the propagating part 133. The propagating part 133 is positioned between the detector 131 and the weld zone 13 when the tip of the detector 130 is caused to contact the weld zone 13. When the detector 131 emits the ultrasonic wave, the ultrasonic wave propagates through the propagating part 133 and is transmitted outside the detector 130. When the ultrasonic wave is reflected, the reflected waves of the ultrasonic wave propagate through the propagating part 133 and reach the detector 131. The detector 131 detects the reflected waves and transmits, to the processing device 120, a signal (a current) indicating the reflected wave intensity. The magnitude (the current value) of the current transmitted from the detector 131 corresponds to the intensity of the reflected wave. The processing device 120 determines the reflected wave intensity based on the current value.

The propagating part 133 includes a resin material through which the ultrasonic wave easily propagates, etc. By providing the propagating part 133 that corresponds to the shape of the weld zone 13 surface, the ultrasonic wave easily propagates into the weld zone 13. Also, deformation, damage, etc., of the detector 131 can be suppressed by the propagating part 133 when the detector 130 contacts the weld zone 13. The propagating part 133 has a hardness sufficient to suppress deformation, damage, etc., when contacting the weld zone 13.

For example, the inspection verifies whether or not the weld zone 13 is formed. Also, the inspection calculates the diameter of the weld zone 13, etc. Hereinafter, the diameter of the weld zone 13 is called the weld diameter. Generally, the weld diameter also is called the nugget diameter.

A couplant 15 is coated onto the surface of the object when probing so that the ultrasonic wave easily propagates between the object and the detector 130. Each of the detection elements 132 transmits an ultrasonic wave US toward the joined body 10 coated with the couplant 15 and receives reflected waves RW from the joined body 10.

For example, as illustrated in FIG. 6, one detection element 132 transmits the ultrasonic wave US toward the weld zone 13. A portion of the ultrasonic wave US is reflected by the upper surface or the lower surface of the joined body 10, etc. The multiple detection elements 132 each receive (detect) the reflected waves RW. The detection elements 132 sequentially transmit the ultrasonic wave US, and the reflected waves RW are detected by the multiple detection elements 132.

FIGS. 7A to 7C are schematic views illustrating an operation of the detector.

As illustrated in FIG. 7A, the ultrasonic wave US is reflected by a surface 133a of the propagating part 133, an upper surface 11a and a lower surface 11b of the first member 11, and an upper surface 13a and a lower surface 13b of the weld zone 13.

The positions in a Z-direction of the surface 133a, the upper surface 11a, the upper surface 13a, the lower surface 11b, and the lower surface 13b are different from each other. In other words, the distances in the Z-direction between the detection element 132 and these surfaces are different from each other. The detection element 132 detects the peaks of the intensities of the reflected waves when detecting the reflected waves from these surfaces. Which surface reflected the ultrasonic wave US can be verified by calculating the time until each peak is detected after transmitting the ultrasonic wave US.

FIGS. 7B and 7C are graphs illustrating the relationship between the time after transmitting the ultrasonic wave US and the intensity of the reflected wave RW. In FIGS. 7B and 7C, the horizontal axis is the detected intensity of the reflected wave RW. The vertical axis is the elapsed time after transmitting the ultrasonic wave US. In other words, the time is the position in the Z-direction. The graph of FIG. 7B illustrates a detection result including the reflected waves RW from the upper and lower surfaces 11a and 11b of the first member 11. The graph of FIG. 7C illustrates a detection result including the reflected waves RW from the upper and lower surfaces 13a and 13b of the weld zone 13. Here, the intensity of the reflected wave RW is represented as an absolute value.

In the graphs of FIGS. 7B and 7C, a peak Pe10 is based on the reflected wave RW from the surface 133a. A peak Pe11 is based on the reflected wave RW from the upper surface 11a. A peak Pe12 is based on the reflected wave RW from the lower surface 11b. The times from the transmission of the ultrasonic wave US until the peak Pe11 and the peak Pe12 are detected correspond respectively to the positions in the Z-direction of the upper and lower surfaces 11a and 11b of the first member 11.

Similarly, a peak Pe13 is based on the reflected wave RW from the upper surface 13a. A peak Pe14 is based on the reflected wave RW from the lower surface 13b. The times from the transmission of the ultrasonic wave US until a peak Pe13 and the peak Pe14 are detected correspond respectively to the positions in the Z-direction of the upper surface 13a and the lower surface 13b of the weld zone 13.

The processing device 120 determines whether or not the peak Pe12 exists in the Z-direction reflected wave intensity distribution at each of multiple points in the X-Y plane. Specifically, the processing device 120 detects a peak in a prescribed range in the Z-direction in which the peak Pe12 may be detected. The processing device 120 compares the intensity of the peak to a prescribed threshold. When the peak is greater than the threshold, the processing device 120 determines that the peak is the peak Pe12. The existence of the peak Pe12 indicates that the lower surface 11b exists at the point and that the first members 11 and 12 are not joined. The processing device 120 determines that the points at which the peak Pe12 is detected are not joined. The processing device 120 sequentially determines whether or not each of the multiple points in the X-Y plane are joined. A cluster of points determined to be joined correspond to the weld zone 13.

The intensity of the reflected wave may be represented in any form. For example, the reflected wave intensity that is output from the detection element 132 may include positive values and negative values according to the phase. Various processing may be performed based on the reflected wave intensity including the positive and negative values. The reflected wave intensity that includes the positive and negative values may be converted into absolute values. The average value of the reflected wave intensities may be subtracted from the reflected wave intensity at each time. Or, the weighted average value, the weighted moving average value, or the like of the reflected wave intensities may be subtracted from the reflected wave intensity at each time. The various processing described in the application can be performed even when the results of such processing applied to the reflected wave intensity are used.

For example, the processing device 120 calculates the weld diameter in the inspection. The weld diameter is the length of the weld zone 13 in any one direction parallel to the X-Y plane. The processing device 120 may calculate the thickness of the weld zone 13 or the depth of the recess of the weld zone 13 in the inspection. The thickness of the weld zone 13 is the distance in the Z-direction between the upper surface 13a and the lower surface 13b. The thickness of the weld zone 13 can be calculated based on a time difference TD1 between the peaks Pe13 and Pe14. The depth of the recess of the weld zone 13 is the distance in the Z-direction between the upper surfaces 11a and 13a. The depth of the recess of the weld zone 13 can be calculated based on a time difference TD2 between the peaks Pe11 and Pe13. The processing device 120 may determine the appropriateness of the weld based on at least one of the weld diameter, the thickness of the weld zone 13, or the depth of the recess of the weld zone 13 and may output the determination result.

The processing device 120 transmits the inspection value calculated in the inspection to the control device 110. Also, the processing device 120 may transmit the determination result to the control device 110.

For example, the welding device 200 welds multiple first members 11 and multiple second members 12 to manufacture multiple joined bodies 10. For example, one resistance spot welding process is repeatedly performed to manufacture multiple joined bodies 10 having the same required inspection value. Also, the welding device 200 may weld one first member 11 and one second member 12 at multiple points. The required inspection value may be the same for the resistance spot welding at the multiple points.

Based on the inspection value obtained in the inspection, the control device 110 adjusts the setting value for when the welding device 200 performs the next resistance spot welding. For example, when an unfavorable inspection value is obtained, the control device 110 adjusts the setting value for the subsequent resistance spot welding to obtain a better inspection value. An unfavorable inspection value has a small effect on the quality of the joined body. For example, an unfavorable inspection value is greater than the reference for obtaining the necessary strength but has a less-than-normal margin with respect to the reference.

The inspection value is, for example, at least one selected from the weld diameter, the thickness of the weld zone 13, or the depth of the recess of the weld zone 13. The setting value is, for example, at least one selected from the magnitude of the current supplied to the members in which the weld zone 13 is formed, the supply time of the current, or the pressure applied to the members.

In the example illustrated in FIG. 4, the magnitude of the current supplied to the members corresponds to the current value V1. The supply time of the current corresponds to the total of the pulse current-on time T5 that is supplied multiple times. The pressure that is applied to the member corresponds to the pressure value V2. Based on the inspection value, for example, the control device 110 performs one or more selected from the increase of the current value V1, the increase of the pressure value V2, or the extension of the supply time.

Also, when an undesirable inspection value is obtained, the control device 110 does not cause the welding device 200 to perform resistance spot welding. An undesirable inspection value has a large effect on the quality of the member after welding. For example, the undesirable inspection value is less than the reference for obtaining the necessary strength and needs improvement.

When the inspection value satisfies a first condition, the control device 110 modifies the setting value for the resistance spot welding and causes the welding device 200 to perform resistance spot welding. When the inspection value satisfies a second condition, the control device 110 does not cause the welding device 200 to perform resistance spot welding. For example, the inspection value being within a prescribed first range is set as the first condition. The inspection value being within a prescribed second range is set as the second condition. The range of the unfavorable inspection values is set as the first range. The range of the undesirable inspection values is set as the second range.

A case where the weld diameter is used as the inspection value for determining the first and second conditions will now be described as a specific example. The weld diameter affects the strength of the joined body 10. To increase the strength of the joined body 10, it is desirable to increase the weld diameter.

Figure 8:
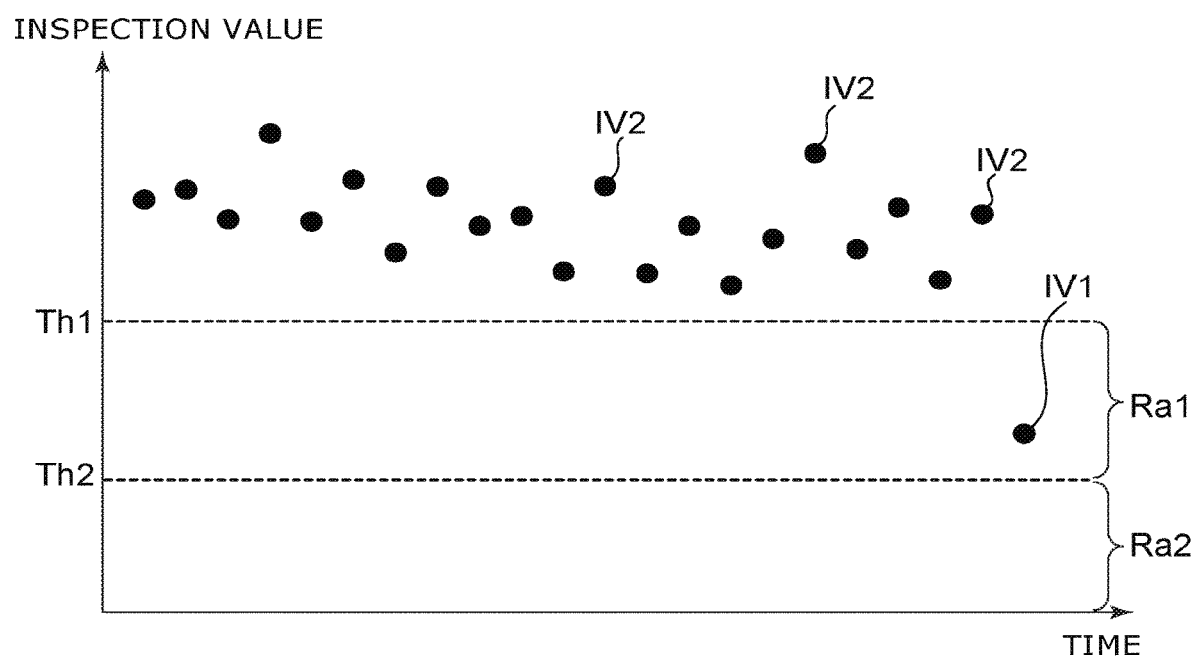
FIG. 8 is a schematic view illustrating an inspection value.

FIG. 8 is a schematic view illustrating the inspection value.

In FIG. 8, the horizontal axis is time. The vertical axis is the size of the inspection value (the weld diameter). For example, as illustrated in FIG. 8, a first threshold Th1 and a second threshold Th2 are set for the weld diameter to determine the first condition and the second condition. The second threshold Th2 is less than the first threshold Th1. A range that is less than the first threshold Th1 and greater than the second threshold Th2 corresponds to a first range Ra1. A range that is less than the second threshold Th2 corresponds to a second range Ra2. For example, the second threshold Th2 is the minimum value necessary to obtain the specified quality. The first threshold Th1 is a more desirable value for improving the quality or maintaining the quality. It is favorable for the first range Ra1 to be sufficiently greater than the fluctuation of the inspection value.

As an example, the first member 11 and the second member 12 are mild steels. The thickness in the Z-direction of the first member 11 is 1.2 mm. The thickness in the Z-direction of the second member 12 is 1.2 mm. It is desirable for the diameter of the weld zone 13 to be greater than 6.2 mm to obtain a shear strength greater than 7.8 kN. In such a case, for example, the first threshold Th1 is set to 6.6 mm. The second threshold Th2 is set to 6.2 mm. For example, the first threshold Th1, the second threshold Th2, the modification amount of the setting values, etc., can be set by referring to a welding parameter table provided by the Resistance Welder Manufacturers Association (RWMA).

In the example illustrated in FIG. 2, the control device 110 receives the weld diameter calculated by the processing device 120. The main controller 111 determines whether or not the weld diameter satisfies the first condition or the second condition. When the weld diameter satisfies the first condition, the main controller 111 transmits a command to at least one of the current controller 112 or the drive controller 113 and modifies the setting values for the resistance spot welding from the predetermined values. When the weld diameter satisfies the second condition, the main controller 111 transmits commands to the current controller 112 and the drive controller 113 and stops the operation.

Generally, for the setting values, the members melt easily and the weld diameter increases as the current supplied to the members is increased. Similarly, the weld diameter increases as the supply time of the current is increased or the pressure applied to the members is increased. When the weld diameter satisfies the first condition, the main controller 111 performs one or more selected from an increase of the current value, an increase of the pressure value, or an extension of the supply time. By modifying the setting value, the weld diameter can be increased.

For the thickness of the weld zone 13 other than the weld diameter, the strength of the weld zone 13 may decrease if the thickness is too small. Also, for the joining member having undergone resistance spot welding, it is desirable for the thickness of the weld zone 13 to be a prescribed proportion greater than the thickness of the solidified portion 14. For example, when performing the resistance spot welding, the thickness of the weld zone 13 decreases as the pressure applied to the members increases. When the thickness is used as the inspection value to determine the first and second conditions, the control device 110 reduces the pressure applied to the members when the thickness satisfies the first condition.

If the depth of the recess of the weld zone 13 is too large, discrepancies may occur in the joined body 10 in subsequent processes. For example, there is a possibility that paint may not adhere uniformly in the recess of the weld zone 13 in the painting process, and the appearance may degrade. In a cleaning process, there is a possibility that dirt that entered the recess may not be sufficiently removed. For example, when performing resistance spot welding, the thickness decreases as the pressure applied to the members increases. When the depth of the recess is used as the inspection value to determine the first and second conditions, the control device 110 reduces the pressure applied to the members when the depth satisfies the first condition.

Figure 9:
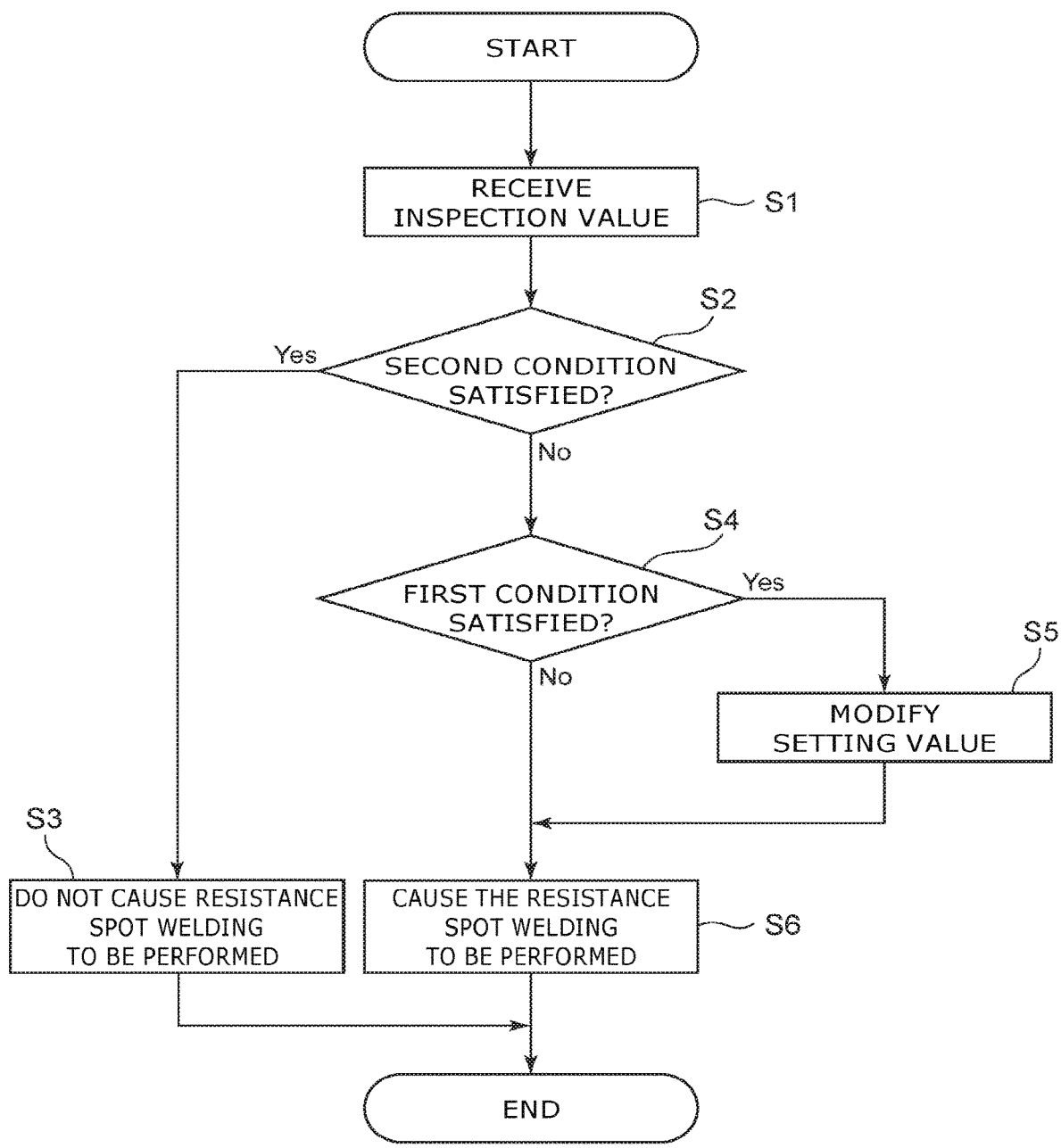
FIG. 9 is a flowchart illustrating processing by a control device according to the embodiment.

FIG. 9 is a flowchart illustrating the processing by the control device according to the embodiment.

When receiving the inspection value (step S1), the control device 110 determines whether or not the inspection value satisfies the second condition (step S2). When the inspection value satisfies the second condition, the control device 110 does not cause the welding device 200 to perform a new resistance spot welding (step S3). For example, when the inspection value does not satisfy the second condition, the control device 110 determines whether or not the inspection value satisfies the first condition (step S4). When the inspection value satisfies the first condition, the control device 110 modifies the setting value for the resistance spot welding (step S5). When the inspection value does not satisfy the first condition or after modifying the setting value, the control device 110 causes the welding device 200 to perform resistance spot welding (step S6).

An example is described above in which the control device 110 receives the inspection value and determines whether or not the first condition or the second condition is satisfied. The processing device 120 may determine whether or not the first condition or the second condition is satisfied. In such a case, the control device 110 receives the determination result from the processing device 120 and controls the welding device 200 based on the determination result.

In the above description, the welding device 200 repeatedly performs resistance spot welding in which the required inspection value is the same. The welding device 200 may perform multiple resistance spot welding processes having mutually-different required inspection values. In such a case, when the inspection value satisfies the first condition in one process, the control device 110 modifies the setting value for the same process as the one process when the same process is performed next.

Effects of the embodiment will now be described.

An inspection of the joined body is performed as described above to confirm the quality of the joined body on which resistance spot welding has been performed. For example, as the welding device 200 repeatedly performs resistance spot welding, there are cases where the inspection value degrades even when the setting values are constant. Specifically, the tips of the lower and upper electrodes 212 and 222 are deformed by repeating the resistance spot welding, and there is a possibility that the structure of the weld zone may change even though the setting values are constant. When the inspection value degrades and the second condition is satisfied, the welding device 200 is stopped, and the cause is investigated. It is desirable to avoid stopping the welding device 200 because the production efficiency decreases. There is also a method in which the degradation of the inspection value is suppressed by regularly performing maintenance of the welding device 200. For example, in the maintenance, the lower electrode 212 and the upper electrode 222 are polished. However, in such a case, there is a possibility that the maintenance may be performed even though the actual inspection value is appropriate. Also, the productivity of the welding device 200 decreases because resistance spot welding cannot be performed during maintenance.

The control device 110 according to the embodiment determines whether or not the inspection value satisfies the first condition in addition to the determination of whether or not the inspection value satisfies the second condition. When the inspection value satisfies the first condition, the control device 110 causes the welding device 200 to perform resistance spot welding after modifying the setting values for the resistance spot welding. Thereby, the inspection value is improved in the subsequent resistance spot welding. For example, when the inspection value gradually degrades, the degradation of the inspection value until the second condition is satisfied can be avoided by improving the inspection value. Also, the period until maintenance becomes necessary can be increased by improving the inspection value. For example, the productivity of the welding device 200 can be increased by avoiding stops of the resistance spot welding or by reducing the frequency of the stops.

The first condition may further include the inspection value not being an outlier. For example, previous inspection values are used in the outlier determination. The previous inspection values are stored in the memory device 140. When receiving a new inspection value, the control device 110 refers to a specified number of previous inspection values. When determining that the new inspection value is an outlier based on the multiple previous inspection values, the control device 110 determines that the inspection value does not satisfy the first condition even though the inspection value is within the first range. The Smirnoff-Grubbs test or Thompson's rejection test can be used to determine the outlier.

In the example illustrated in FIG. 8, an inspection value IV1 is within the first range Ra1. When the inspection value IV1 is obtained, the control device 110 refers to multiple previous inspection values IV2. When the new inspection value IV1 is determined to be an outlier based on the multiple previous inspection values IV2, the control device 110 determines that the inspection value IV1 does not satisfy the first condition. In other words, the control device 110 does not modify the setting values for performing the next resistance spot welding from the predetermined value.

The likelihood is high that the inspection value that is determined to be an outlier deviates from the actual value relating to the weld zone 13. When the inspection value is determined to be an outlier, the likelihood of uselessly modifying the setting values can be reduced by not modifying the setting values. For example, the modification of the setting values even though an appropriate inspection value actually has been obtained can be suppressed.

Similarly, the second condition may further include the inspection value not being an outlier. In other words, even when the inspection value is within the second range, the welding device 200 is caused to perform the next resistance spot welding when the inspection value is determined to be an outlier. A stop of the resistance spot welding even though an appropriate inspection value actually has been obtained can be suppressed. Or, it may be determined that the second condition is satisfied when the inspection value is within the second range regardless of whether or not the inspection value is an outlier. The likelihood of producing a member that may have a quality problem can be reduced thereby.

When the inspection value satisfies the first condition, the modification amount of the setting value may be constant or may correspond to the difference between the inspection value and the first threshold. By increasing the modification amount as the difference between the inspection value and the first threshold increases, the inspection values of subsequent resistance spot welding may be improved more. Or, by setting the modification amount to be constant, the effects on the change of the inspection value due to the modification of the setting value can be stabilized, and unexpected fluctuation of the inspection value can be suppressed.

When the inspection value satisfies the first condition even though the setting value is modified, the control device 110 may further modify the setting value. For example, the control device 110 modifies the setting value within a tolerance range relating to the setting value. The tolerance range is preset based on the perspective of the safety of the welding device 200, etc.

For example, after the setting value is modified, the modification of the setting value is continued until the welding device 200 is stopped due to maintenance, etc. Thereby, the improvement of the inspection value is sustained even in the case where the inspection value would gradually degrade.

According to the manufacturing method including the control method described above, the productivity can be increased. Specifically, one or more joined bodies is manufactured in the manufacturing method. Multiple members are joined in the joined body at the weld zone formed by resistance spot welding. Resistance spot welding is performed in the manufacturing processes of the joined bodies. Common standard values are set for these resistance spot welding processes respectively for the increase time T1, the pressing time T2, the pressure decrease time T3, the squeeze time T4, the current-on time T5, the current-off time T6, the hold time T7, the current value V1, and the pressure value V2. When one joined body is manufactured, the weld zone of the joined body is inspected. When the inspection value does not satisfy the first condition or the second condition, the standard value is set as the setting value of the resistance spot welding when manufacturing another joined body. When the inspection value satisfies the first condition, the resistance spot welding for manufacturing the other joined body is performed after modifying the setting value. When the inspection value satisfies the second condition, the resistance spot welding for manufacturing the other joined body is not performed. According to the manufacturing method, the inspection value of the other joined body can be improved, and the period until maintenance becomes necessary can be increased.

An example is described above in which resistance spot welding is performed as resistance welding. Resistance seam welding may be performed as the resistance welding. In resistance seam welding, a pair of roller electrodes is used as the lower electrode 212 and the upper electrode 222 illustrated in FIG. 2. A line-shaped weld zone is formed by supplying a current while pressing the multiple members with the roller electrodes.

When resistance seam welding is performed, at least one selected from the width of the weld zone, the thickness of the weld zone, or the depth of the recess of the weld zone is used as the inspection value. The width of the weld zone is the length of the weld zone in a direction perpendicular to the direction in which the multiple members are overlaid and the line direction in which the weld zone extends.

When the inspection value satisfies the first condition, the control device 110 modifies the setting value for resistance seam welding and causes the welding device 200 to perform resistance seam welding. When the inspection value satisfies the second condition, the control device 110 does not cause the welding device 200 to perform resistance seam welding.

In resistance seam welding, the flow of the current and the pressing applied to the multiple members are continuously performed. The setting value that is modified based on the inspection value is at least one selected from the current value supplied to the multiple members, the pressure value pressing the multiple members, or the rotational speed of the electrodes.

Modification

The inspection of the weld zone described above may be automatically performed by a robot.

Figure 10:
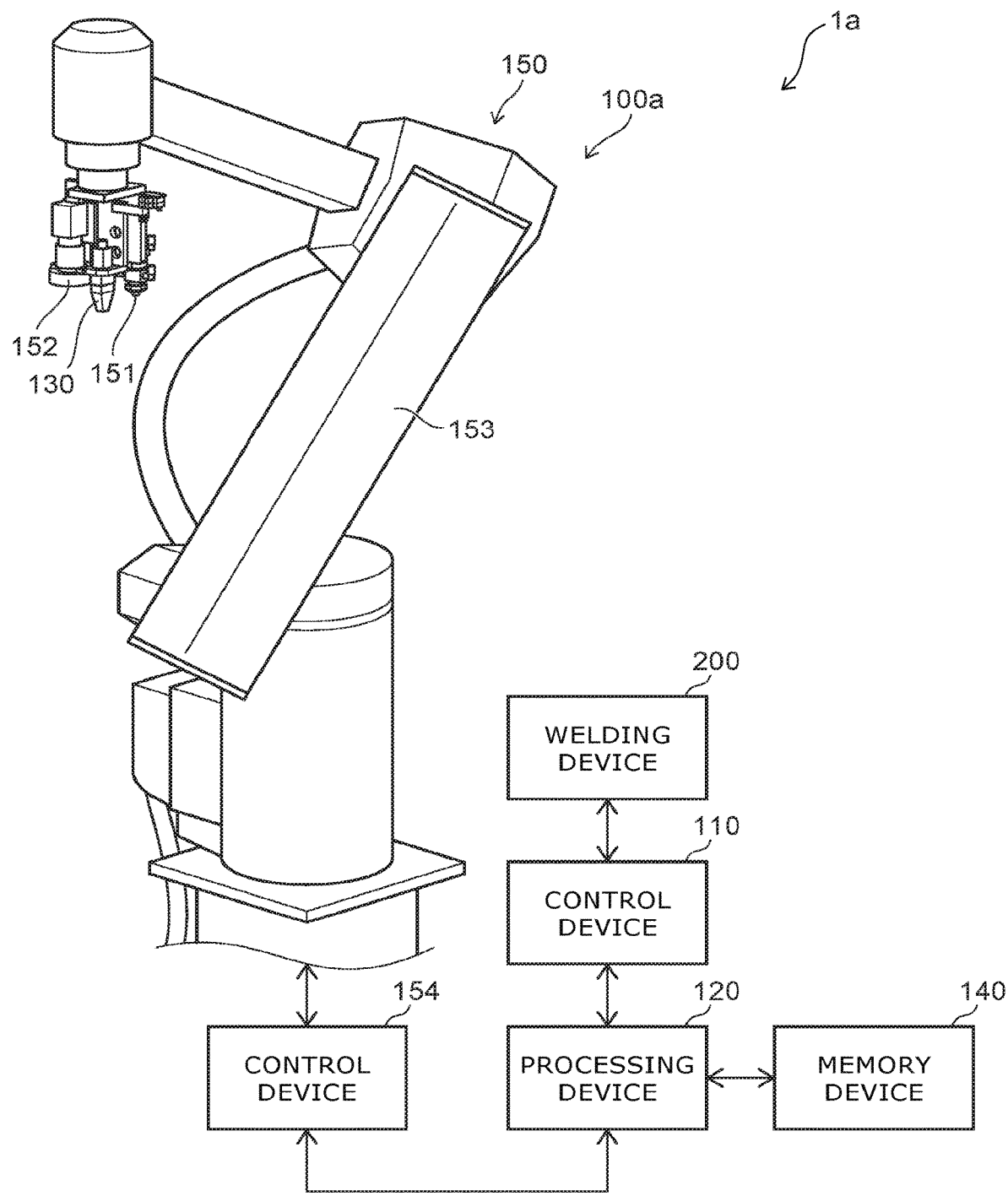
FIG. 10 is a schematic view illustrating a configuration of a control system according to a modification of the embodiment.

FIG. 10 is a schematic view illustrating a configuration of a control system according to a modification of the embodiment.

Figure 11:
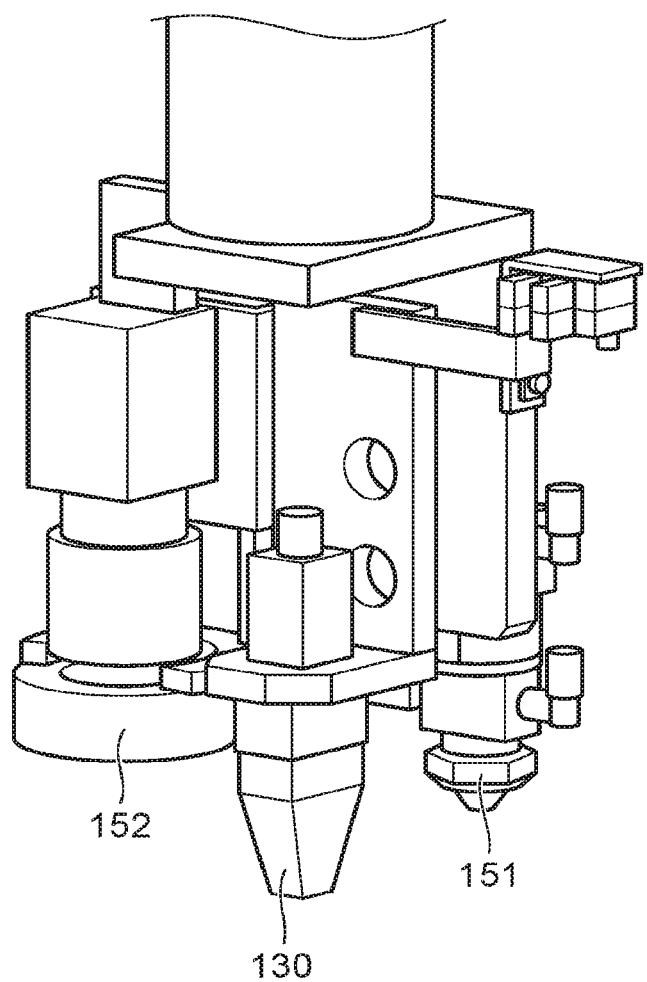
FIG. 11 is a perspective view illustrating a portion of the control system according to the modification of the embodiment.

FIG. 11 is a perspective view illustrating a portion of the control system according to the modification of the embodiment.

The control system 100a illustrated in FIG. 10 includes the control device 110, the processing device 120, the detector 130, the memory device 140, and a robot 150. A welding system 1a includes the control system 100a and the welding device 200. The robot 150 includes an imaging device 151, a coating apparatus 152, a manipulator 153, and a control device 154.

The imaging device 151 acquires an image by imaging the weld member. The imaging device 151 extracts a weld mark from the image and detects the position of the weld zone 13. The coating apparatus 152 coats a couplant onto the upper surface of the weld zone 13.

The detector 130, the imaging device 151, and the coating apparatus 152 are provided at the tip of the manipulator 153 as illustrated in FIG. 11. The manipulator 153 is vertical articulated, horizontal articulated, or a parallel link-type. The detector 130, the imaging device 151, and the coating apparatus 152 can be displaced by driving the manipulator 153. The control device 154 controls the operations of the components (the imaging device 151, the coating apparatus 152, and the manipulator 153) of the robot 150. The detector 130 is controlled by the processing device 120 or the control device 154.

Figure 12:
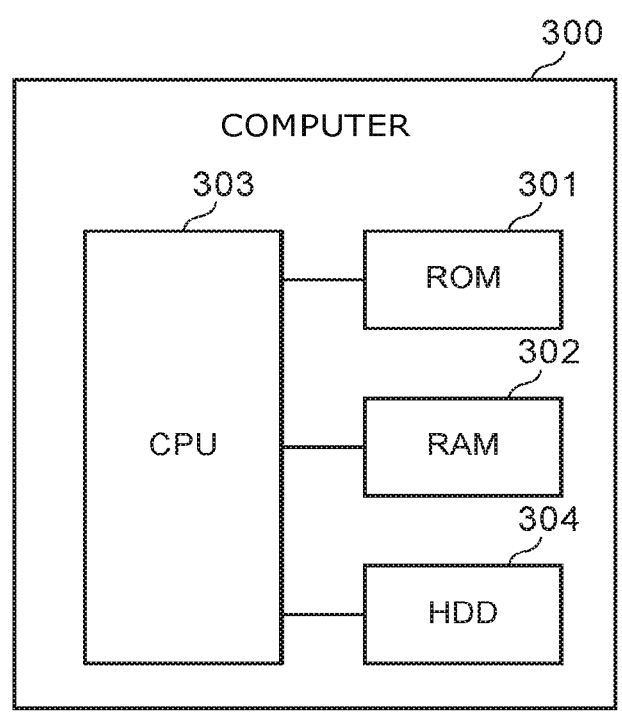
FIG. 12 is a block diagram illustrating a hardware configuration.

FIG. 12 is a block diagram illustrating a hardware configuration.

For example, the control device 110 and the processing device 120 each include computers 300. The computer 300 includes ROM (Read Only Memory) 301, RAM (Random Access Memory) 302, a CPU (Central Processing Unit) 303, and a HDD (Hard Disk Drive) 304.

The ROM 301 stores programs controlling the operations of the computer. The ROM 301 stores programs necessary for causing the computer to realize the processing described above.

The RAM 302 functions as a memory region where the programs stored in the ROM 301 are loaded. The CPU 303 includes a processing circuit. The CPU 303 reads a control program stored in the ROM 301 and controls the operation of the computer according to the control program. Also, the CPU 303 loads various data obtained by the operation of the computer into the RAM 302. The HDD 304 stores data necessary for reading and data obtained in the reading process. For example, the HDD 304 may function as the memory device 140 illustrated in FIG. 1.

Instead of the HDD 304, the control device 110 and the processing device 120 may include an eMMC (embedded Multi Media Card), a SSD (Solid State Drive), a SSHD (Solid State Hybrid Drive), etc. The processing and the functions of the control device 110 and the processing device 120 may be realized by collaboration between more computers. Or, one computer may function as the control device 110 and the processing device 120.

The productivity of the welding device can be increased by using the control device, the control method, the control system, or the welding system described above. Also, similar effects can be obtained by using a program for causing a computer to operate as the control device. Also, according to the method for manufacturing the joined body described above, the productivity of the joined body can be increased.

The processing of the various data recited above may be recorded in a magnetic disk (a flexible disk, a hard disk, etc.), an optical disk (CD-ROM, CD-R, CD-RW, DVD-ROM, DVD±R, DVD±RW, etc.), semiconductor memory, or another recording medium as a program that can be executed by a computer.

For example, the data that is recorded in the recording medium can be read by a computer (or an embedded system). The recording format (the storage format) of the recording medium is arbitrary. For example, the computer reads the program from the recording medium and causes a CPU to execute the instructions recited in the program based on the program. In the computer, the acquisition (or the reading) of the program may be performed via a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A control system, comprising:
a detector transmitting an ultrasonic wave toward a weld zone formed by resistance spot welding and detecting a reflected wave, a plurality of members joined at the weld zone, the reflected wave including a plurality of peaks of intensities based on surfaces of the plurality of members;
a processing device receiving a detection result of the reflected wave, determining whether or not a peak of the plurality of peaks based on a surface where the plurality of members are joined is present, and calculating a diameter of the weld zone based on a result of the determining; and
a control device controlling a welding device performing resistance spot welding,
the control device receiving the diameter,
in a case where the diameter is within a first range, the control device modifies a setting value for a next resistance spot welding and causes the welding device to perform the next resistance spot welding, the first range being not more than a first threshold and not less than a second threshold, and
in a case where the diameter is within a second range, the control device does not cause the welding device to perform the next resistance spot welding, the second range being not more than the second threshold.

2. The control system according to claim 1, wherein in a case where the diameter is within the first range and an outlier with respect to a plurality of previous diameters, the control device does not modify the setting value for the next resistance spot welding.

3. The system according to claim 1, wherein the control device determines whether or not the diameter is within the first range or the second range.

4. The control system according to claim 1, wherein the first threshold and the second threshold are prescribed, and the second threshold being a standard for obtaining a prescribed quality of the weld zone.

5. The control system according to claim 1, wherein the setting value is at least one selected from a magnitude of a current supplied to a member in which the weld zone is formed, a supply time of the current, or a pressure applied to the member.

6. The control system according to claim 1, further comprising:
a manipulator,
the detector being provided at a tip of the manipulator.

7. The control system according to claim 1, wherein
the processing device determines whether or not the diameter is within the first range or the second range, and transmits a determination result of the determination to the control device.

8. A welding system, comprising: the control system according to claim 1; and the welding device.

9. A control method for controlling a welding device performing resistance spot welding, comprising:
- transmitting an ultrasonic wave toward a weld zone formed by resistance spot welding and detecting a reflected wave, a plurality of members joined at the weld zone, the reflected wave including a plurality of peaks of intensities based on surfaces of the plurality of members;
- determining whether or not a peak of the plurality of peaks based on a surface where the plurality of members are joined is present;
- calculating a diameter of the weld zone based on a result of the determining;
- in a case where the diameter is within a first range, modifying a setting value for a next resistance spot welding and causing the welding device to perform the next resistance spot welding, the first range being not more than a first threshold and not less than a second threshold; and
- in a case where the diameter is within a second range, not causing the welding device to perform the next resistance spot welding, the second range being not more than the second threshold.

10. The control method according to claim 9, wherein the setting value is at least one selected from a magnitude of a current supplied to a member in which the weld zone is formed, a supply time of the current, or a pressure applied to the member.

11. A method for manufacturing a joined body, the joined body including a plurality of members, the plurality of members overlapping in a first direction and joined at a weld zone formed by resistance spot welding,
the method comprising:
- transmitting an ultrasonic wave toward a weld zone formed by resistance spot welding and detecting a reflected wave, a plurality of members joined at the weld zone, the reflected wave including a plurality of peaks of intensities based on surfaces of the plurality of members;
- determining whether or not a peak of the plurality of peaks based on a surface where the plurality of members are joined is present;
- calculating a diameter of the weld zone based on a result of the determining;
- in a case where the diameter is within a first range, performing a next resistance spot welding after modifying a setting value of the next resistance spot welding for manufacturing another joined body, the first range being not more than a first threshold and not less than a second threshold; and
- in a case where the diameter is within a second range, not performing the next resistance spot welding to manufacture the other of the joined bodies, the second range being not more than the second threshold.

12. The manufacturing method according to claim 11, wherein
maintenance of a welding device performing the resistance spot welding is performed in a case where the diameter is within the second range.

13. The manufacturing method according to claim 11, wherein
the setting value is at least one selected from a magnitude of a current supplied to the plurality of members, a supply time of the current, or a pressure applied to the members.

14. A non-transitory computer-readable storage medium storing a program,
the program:
- causing a detector to transmit an ultrasonic wave toward a weld zone formed by resistance spot welding and detect a reflected wave, a plurality of members joined at the weld zone, the reflected wave including a plurality of peaks of intensities based on surfaces of the plurality of members;
- causing a processing device to receive a detection result of the reflected wave, determine whether or not a peak of the plurality of peaks based on a surface where the plurality of members are joined is present, and calculate a diameter of the weld zone based on a result of the determining; and
- causing a computer to receive the diameter,
- in a case where the diameter is within a first range, the computer modifies a setting value for a next resistance spot welding and causes a welding device to perform the next resistance spot welding, the first range being not more than a first threshold and not less than a second threshold, and
- in a case where the diameter is within a second range, the computer does not cause the welding device to perform the next resistance spot welding, the second range being not more than the second threshold.

15. The storage medium according to claim 14, wherein the diameter is the diameter of the weld zone in a second direction,
the second direction is perpendicular to the first direction,
the first threshold and the second threshold are prescribed, and
the second threshold being a standard for obtaining a prescribed quality of the weld zone.

16. The storage medium according to claim 14, wherein the setting value is at least one selected from a magnitude of a current supplied to a member in which the weld zone is formed, a supply time of the current, or a pressure applied to the member.

* * * * *